July 18, 1961  L. CALLAHAN  2,992,537
PLOW FOR LAYING AND UNCOVERING PIPE
Filed Oct. 20, 1958  3 Sheets-Sheet 1
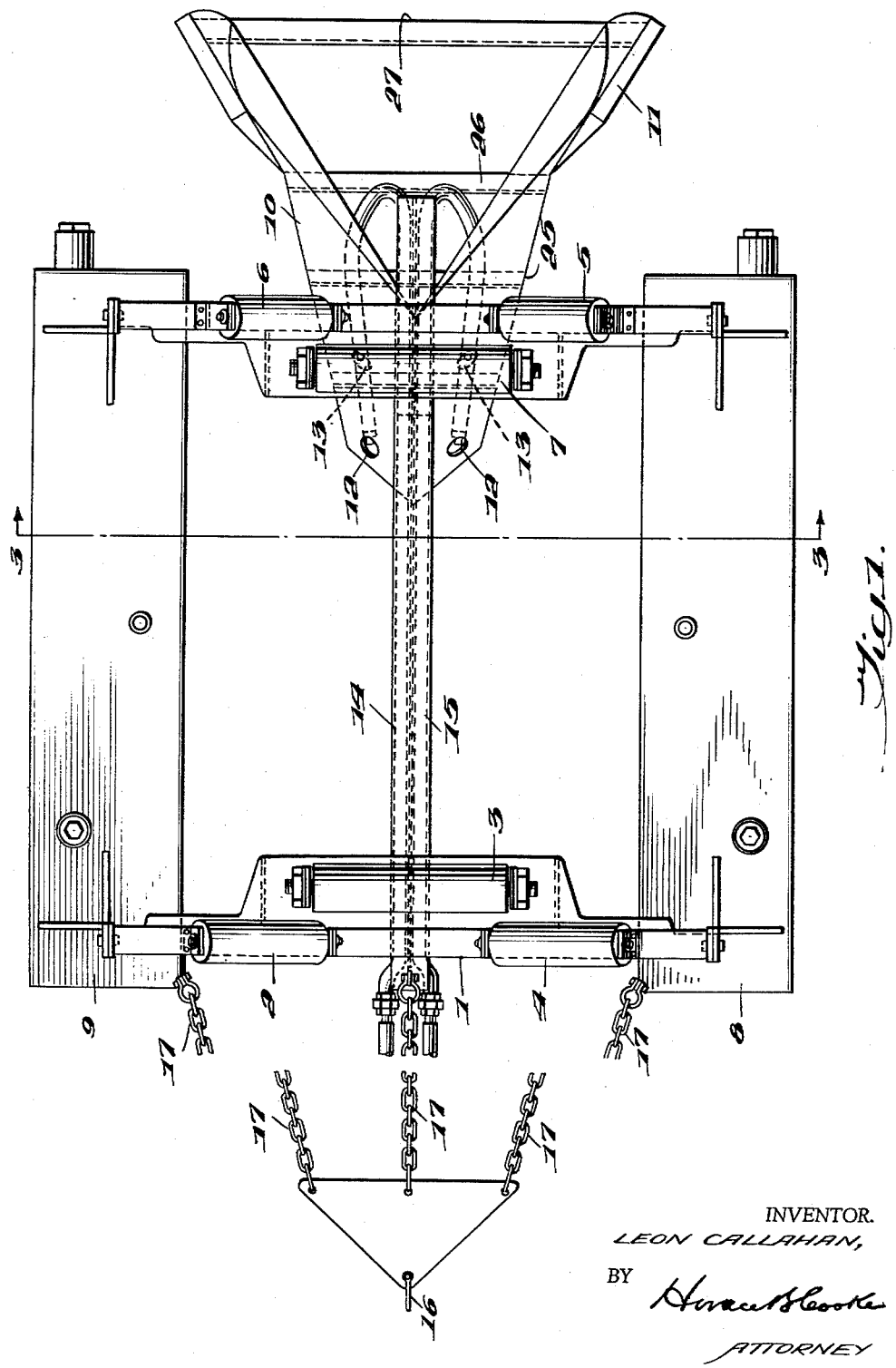
INVENTOR.
LEON CALLAHAN,
BY
ATTORNEY

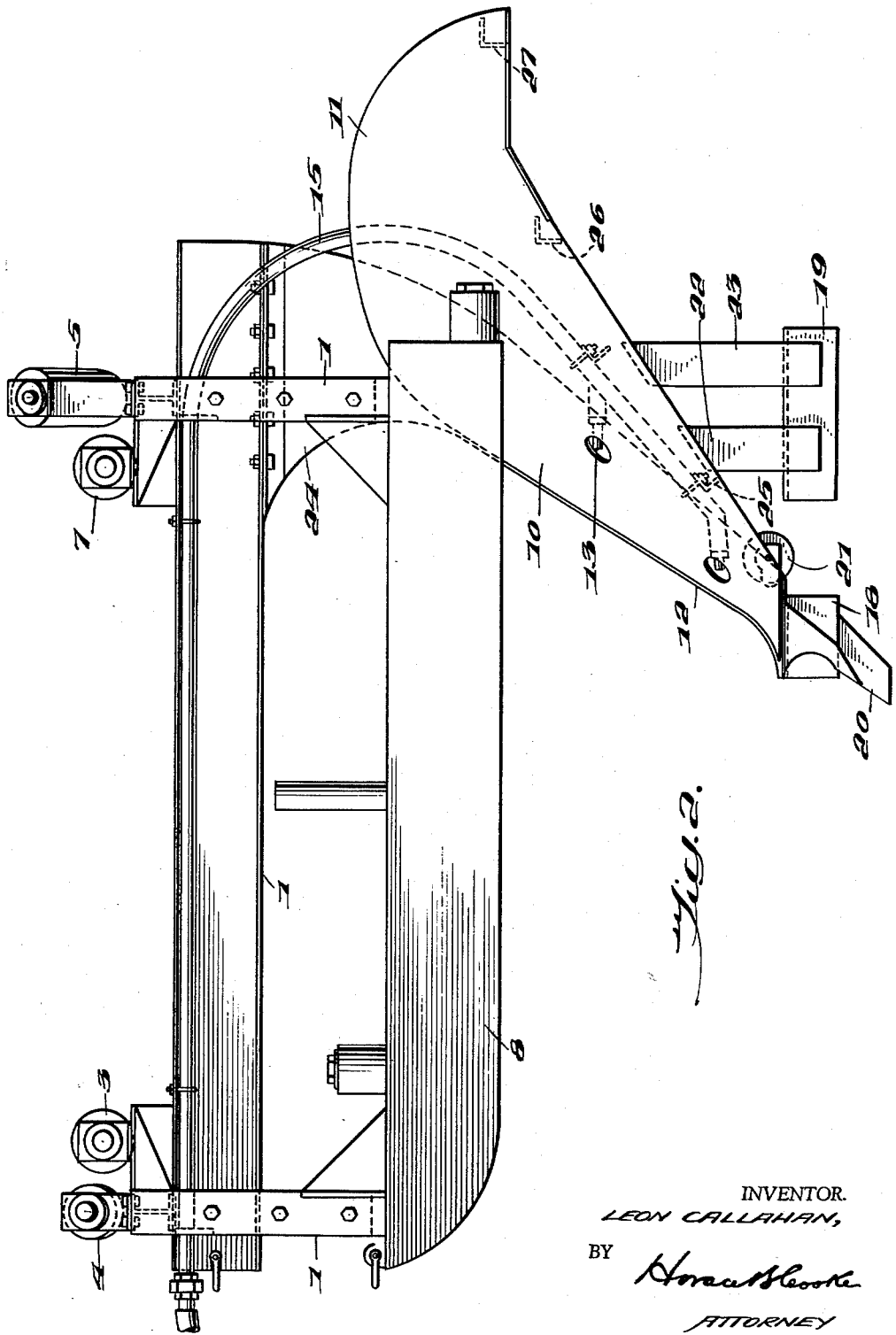

July 18, 1961 L. CALLAHAN 2,992,537
PLOW FOR LAYING AND UNCOVERING PIPE
Filed Oct. 20, 1958 3 Sheets-Sheet 3
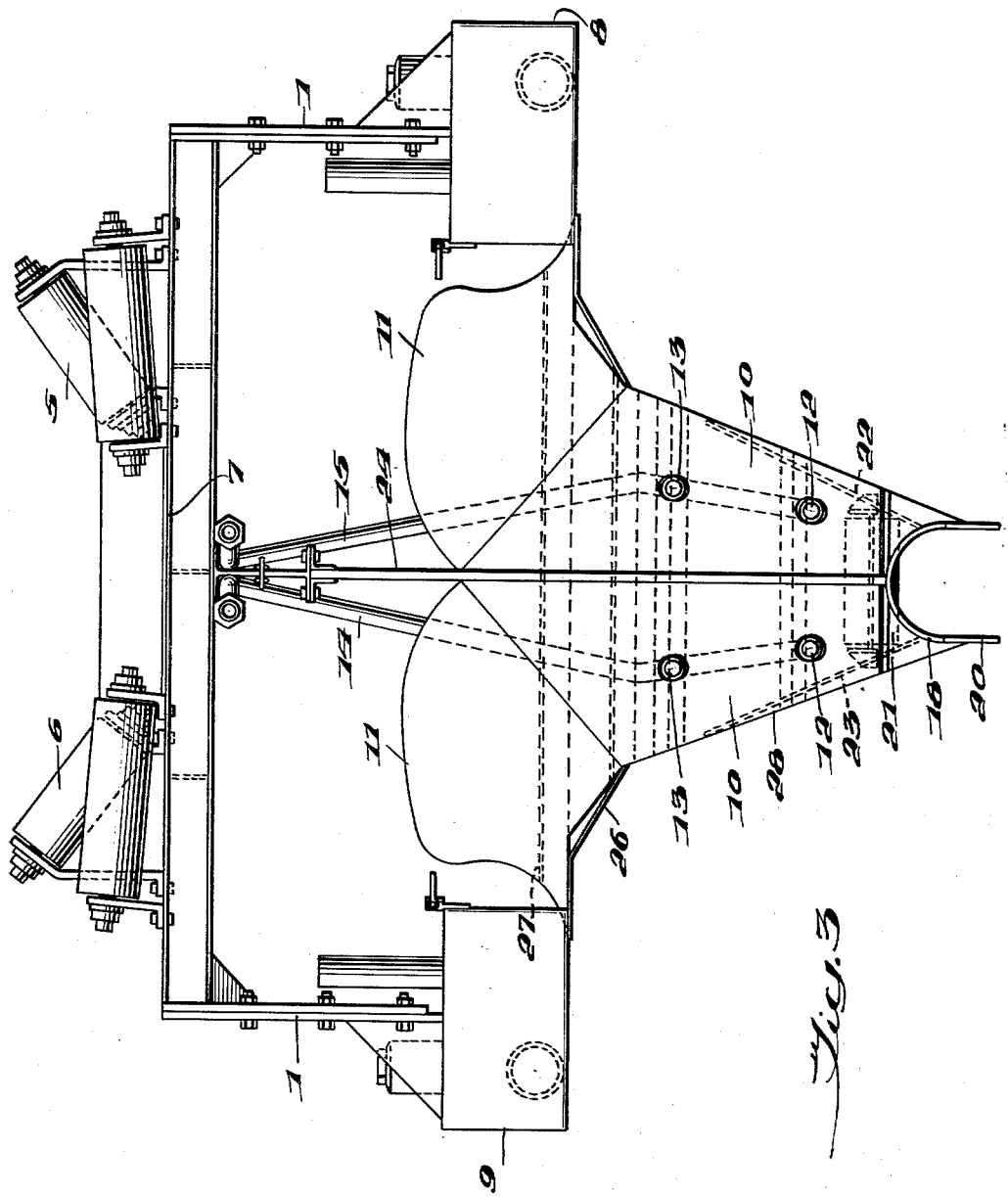
INVENTOR.
LEON CALLAHAN,
BY
ATTORNEY

2,992,537
PLOW FOR LAYING AND UNCOVERING PIPE
Leon Callahan, Triumph, La., assignor to Gulf Oil Corporation, Pittsburgh, Pa., a corporation of Pennsylvania
Filed Oct. 20, 1958, Ser. No. 768,238
1 Claim. (Cl. 61—72)

This invention relates to a plow to be used in laying or uncovering pipe, cable, etc., on the bottom of a bed or body of water. More particularly, it comprises a plow with nozzles that direct jets of water to dig a trench or uncover a buried pipe line, and moldboards to direct excavated material away from the ditch. The plow point is equipped with moldboard extensions to allow pipe to be straddled and protected in uncovering pipe buried in the bed of the body of water, with skids in the form of ballast tanks which are flooded to cause it to ride on the bottom of the body of water, and with the necessary apparatus to allow the plow to be towed behind a barge. An essential feature of this invention is an extension of the bottom of the moldboard to guide the plow along the pipe and a roller positioned to prevent injury to the pipe when the plow is used in uncovering buried pipe lines.

In the placement of pipe lines or cable at the bottom of a body of water, such as in coastal waters, it is desirable to embed the pipe in order to minimize attack of marine life and chemical and electrolyte corrosion. It is therefore desirable to provide an apparatus capable of digging a trench for the pipe line and subsequently to bury the line, which apparatus can be used as well to uncover a pipe line already buried when it is necessary or desirable to move or remove it for any reason.

An object of this invention is to provide a plow-like apparatus which utilizes jets of water to dig a trench for burying pipe, as well as to remove muck from a pipe line already buried in a body of water.

Another object of the invention is to provide a jet plow with moldboards that direct the excavated material away from the ditch dug by the jets of water.

It is a further object of the invention to provide a plow equipped with rollers mounted on top of the plow to permit a simultaneous ditching and pipe laying operation.

It is a more specific object of this invention to provide a plow with extensions to the plow point to allow a buried line to be straddled, and a roller positioned on the device to support the weight of the plow and allow it to slide easily and without damage to the pipe or its protective coating in pipe line uncovering operations.

Other objects and advantages of this invention will become obvious from the following detailed description of the preferred embodiments illustrated in the following drawings, in which FIGURE 1 is a top view of the plow showing the means to keep the plow on the bottom of the body of water and the means to attach the device to the towing barge.

FIGURE 2 is a side view of the jet plow apparatus.

FIGURE 3 is a front view of the plow, as viewed to the right of section line 3—3 of FIGURE 1, showing placement of the moldboard extension and pipe protecting roller.

Referring more particularly to the drawings, FIGURE 1 shows the apparatus comprising a principal body portion or frame 1 on which rollers 2, 3 and 4 are journalled in brackets on top of the forward cross member, and rollers 5, 6 and 7 are similarly mounted on the rear cross member above the plow. The end rollers of each series are inclined to provide a cradle for support of the pipe when the plow is used in the ditching and pipe laying operations. Attached to the side rails of frame 1 are skids 8 and 9 in the form of ballast tanks which in use are flooded to hold the apparatus on the bottom of a body of water.

The plow itself is attached to the rear cross member of frame 1 and comprises moldboards 10 which diverge angularly on opposite side of a central, vertical plane, and which at their wide, rearward portions are provided with scoop-shaped wings 11 for directing and depositing the plowed earth on either side of the furrow or ditch.

Jet nozzles 12 and 13, which are located in openings in the moldboard 10, are fed through water feed lines 14 and 15 to direct forceful streams to the formation ahead of the plow. In the ditching and pipe laying operation the jets of water dig the ditch and the moldboard remove the excavated material. In operation, the pipe to be covered is laid on top of the apparatus, on the rollers, and slides into the ditch as the apparatus is moved forward while being towed along the bottom by means of a towing line 16 attached to frame 1 and skids 8 and 9 by means of chains 17.

In the side view of FIGURE 2 the construction of the apparatus is emphasized. The position of the jet nozzles 12 and 13, fed by the water feed line 15, in the lower front section of the moldboard 10, is illustrated in this figure. In addition, this figure shows a side view of the front pipe saddle 18, rear pipe saddle 19, moldboard extension 20, and the pipe protecting roller 21. These four elements are the essential parts in the pipe uncovering operation. The pipe saddles 18 and 19 are U-shaped saddles of appropriate length and of somewhat greater diameter than that of the pipe along which they are drawn. The forward saddle 18 is an extension of the moldboard at the forward end of the plow. The rear saddle 19 is spaced in axial direction from the forward saddle and is in horizontal as well as vertical alignment with the forward saddle. The rear saddle 19 depends from the moldboards and is attached to the moldboards by means of braces 22 and 23. A roller 21 is journalled to the underside of the moldboard between the pipe saddles and is of such diameter that it extends slightly below the vertex of the semi-circle of the saddles to rest on the pipe and space the plow therefrom in operation.

In uncovering a pipe, the two saddles 18 and 19 straddle the pipe and hold the plow in the proper alignment on the pipe line. The roller on top of the pipe sustains the weight of the plow and prevents injury to the pipe or pipe covering. Jets of water from the jet nozzles 12 and 13 loosen the earth ahead of the plow as it is drawn along the pipe and the muck which is thereby more readily removed is thrown away from the ditch by the moldboards 10 and wings 11.

FIGURE 3 is a front view of the apparatus and shows the construction details of the forward pipe saddle 18, the moldboard extension 20 and the roller 21. The rearward saddle is supported by braces 22 and 23 extending diagonally from the saddle to the sides of the moldboard 10. The plow is vertically attached to the rear cross member of the frame 1 by means of a beam 24 which extends from between the moldboards forwardly to the front cross member of frame 1. Horizontal braces 25, 26 and 27 extend horizontally between the moldboards to make the plow rigid.

It is apparent from the foregoing that the invention provides a jet plow that can be used in underwater pipe line operations. The positioning of the hydraulic jets makes the plow a valuable tool in underwater ditching and pipe laying operations. The attachment of the forward pipe saddle, as an extension to the moldboard cooperating with a rear pipe saddle and roller, makes the jet plow useful in uncovering lines as well. The cooperation of the front and rear pipe saddles with the roller positioned beneath the moldboard to guide the plow in travel along the pipe line, and at the same time to prevent damage to the pipe line, emphasizes the advantage of the plow in uncovering buried underwater pipe lines.

Having set forth the nature of my invention, I claim:

Apparatus for digging a trench for, and uncovering, a pipeline in the bottom of a body of water comprising an elongated frame, a pair of skids for supporting the frame on the bottom of the body of water attached one on each side of the frame and extending longitudinally thereof, first roller guides mounted above the forward end of the frame for support and guidance of the pipe to be laid, second roller guides mounted on the upper surface of the rear end of the frame for support and guidance of the pipe to be laid, a plow element extending downwardly from the rear end of the frame between the skids, said plow element being in alignment with the first and second roller guides whereby the roller guides direct the pipes into the trench cut by the plow, said plow element having a pair of moldboards diverging angularly upwardly and rearwardly, said moldboards having their upper edge extending to a level above the bottom of the skids, openings in the moldboards, nozzles mounted in position behind the moldboards to discharge water forwardly through the openings, means for supplying water to the nozzles, a wing extending upwardly along the upper and outer edge of each of the moldboards, each of said wings having a substantially horizontal edge extending laterally beyond the outer edge of the moldboards and being concave upwardly to cut dirt from the top of the pile discharged by the moldboards and carry the dirt laterally beyond the outer edge of the moldboards, a forward concave downwardly facing saddle extending from the lower edge of the moldboards, a rear concave downwardly facing saddle supported between the moldboards in alignment with the forward saddle, and a roller mounted in longitudinal alignment with and between the forward and rear saddle, said roller extending below the vertex of the saddles to support the plow on the pipe when using the plow to uncover pipe.

References Cited in the file of this patent

UNITED STATES PATENTS

| | | |
|---|---|---|
| 815,163 | Hatfield | Mar. 13, 1906 |
| 1,910,481 | Smith | May 23, 1933 |
| 2,414,994 | Wright | Jan. 28, 1947 |
| 2,528,231 | Knapp | Oct. 31, 1950 |
| 2,602,300 | Collins | July 8, 1952 |
| 2,610,415 | Glaser | Sept. 16, 1952 |
| 2,748,506 | Stosberg | June 5, 1956 |
| 2,879,649 | Elliott | Mar. 31, 1959 |

FOREIGN PATENTS

| | | |
|---|---|---|
| 705,470 | Germany | Apr. 29, 1941 |